(12) United States Patent
Lee

(10) Patent No.: US 11,293,533 B2
(45) Date of Patent: Apr. 5, 2022

(54) BALL SCREW ASSEMBLY

(71) Applicant: Szu-Ying Lee, New Taipei (TW)

(72) Inventor: Szu-Ying Lee, New Taipei (TW)

( * ) Notice: Subject to any disclaimer, the term of this patent is extended or adjusted under 35 U.S.C. 154(b) by 16 days.

(21) Appl. No.: 16/816,115

(22) Filed: Mar. 11, 2020

(65) Prior Publication Data

US 2021/0164547 A1    Jun. 3, 2021

(30) Foreign Application Priority Data

Nov. 29, 2019    (CN) .......................... 201911205361.9

(51) Int. Cl.
 *F16H 25/20*    (2006.01)
 *F16H 25/22*    (2006.01)

(52) U.S. Cl.
 CPC ..... *F16H 25/2214* (2013.01); *F16H 25/2233* (2013.01)

(58) Field of Classification Search
 CPC .. F16H 25/2214; F16H 25/2233; F16H 25/20; F16H 25/2204
 See application file for complete search history.

(56) References Cited

U.S. PATENT DOCUMENTS

| | | | | |
|---|---|---|---|---|
| 3,186,250 A | * | 6/1965 | Boutwell | F16H 25/2204 74/424.94 |
| 3,577,796 A | * | 5/1971 | Eissfeldt | F16H 25/22 74/424.83 |
| 5,012,687 A | * | 5/1991 | Hoshide | F16H 25/2214 74/89.36 |
| 5,388,475 A | | 2/1995 | Shear, III et al. | |
| 7,234,368 B1 | * | 6/2007 | Lin | F16H 25/2214 74/424.83 |
| 2009/0090207 A1 | * | 4/2009 | Chang | F16H 25/2214 74/424.86 |
| 2010/0122597 A1 | * | 5/2010 | Liou | F16H 25/2214 74/424.88 |
| 2011/0303036 A1 | * | 12/2011 | Chen | F16H 25/2214 74/424.83 |

(Continued)

FOREIGN PATENT DOCUMENTS

| | | |
|---|---|---|
| CN | 101539190 A | 9/2009 |
| EP | 0281491 A1 | 9/1988 |

(Continued)

*Primary Examiner* — Zakaria Elahmadi
(74) *Attorney, Agent, or Firm* — Innovation Capital Law Group, LLP; Vic Lin

(57) ABSTRACT

A ball screw assembly includes a guider, an open nut, open shields, a first circulator, a second circulator, and ball circulating assemblies. The open nut is slidably fitted over the guider and includes an axial cylinder having an axial opening. Inner spiral channels of the axial cylinder and spiral channels of the guider form inner ball races. The open shields are coaxially fitted over the axial cylinder. An inner peripheral wall of each of the open shields and an outer annular wall of the axial cylinder form an outer ball race. The first circulator and the second circulator are disposed on the axial cylinder corresponding to the open shields. The inner ball races, first curves of the first circulator, the outer ball races, and second curves of the second circulator form ball circulating races, and the ball circulating assemblies roll in the ball circulating races.

13 Claims, 7 Drawing Sheets

(56) References Cited

U.S. PATENT DOCUMENTS

| | | | | |
|---|---|---|---|---|
| 2012/0103121 A1* | 5/2012 | Kuo | ................... | F16H 25/2214 |
| | | | | 74/424.86 |
| 2012/0137808 A1* | 6/2012 | Chen | ................... | F16H 25/2214 |
| | | | | 74/424.88 |
| 2012/0304793 A1* | 12/2012 | Chen | ................... | F16H 25/2214 |
| | | | | 74/424.88 |
| 2015/0152946 A1* | 6/2015 | Piltz | ................... | F16H 25/2214 |
| | | | | 74/424.87 |

FOREIGN PATENT DOCUMENTS

| | | |
|---|---|---|
| KR | 930010902 B1 | 11/1993 |
| KR | 20000006461 A | 1/2000 |
| KR | 101909393 B1 | 10/2018 |
| TW | 200938750 A | 9/2009 |
| TW | 200938751 A | 9/2009 |
| TW | M477519 U | 5/2014 |
| TW | M593484 U | 4/2020 |
| TW | M593489 U | 4/2020 |
| TW | M593490 U | 4/2020 |
| WO | 9809098 A1 | 3/1998 |

* cited by examiner

BALL SCREW ASSEMBLY

CROSS-REFERENCE TO RELATED APPLICATION

This non-provisional application claims priority under 35 U.S.C. § 119(a) to Patent Application No. 201911205361.9 filed in China, P.R.C. on Nov. 29, 2019, the entire contents of which are hereby incorporated by reference.

BACKGROUND

Technical Field

The instant disclosure relates to a ball screw assembly, in particular, to a ball screw assembly with an open nut having an axial opening.

Related Art

The ball screw device known to the inventor is provided for converting a rotation motion into a linear motion through the cooperation between the screw and the nut. By the cooperation between the ball nut provided with balls rolling in the circulating race and the screw provided with a spiral groove, the friction between the ball nut and the screw can be reduced during the operation.

Most of the ball nuts known to the inventor have complete cylinder shapes. When the length of the screw is longer and is provided with a supporting holder for preventing the screw from sagging, a resilient mechanism is provided on the supporting holder. Hence, when the ball nut rotates around the screw and passes the portion of the screw having the supporting holder, the supporting holder is temporally moved away from the screw through the resilient mechanism. Next, after the ball nut passes the portion of the screw having the supporting holder, the resilient mechanism moves the supporting holder back to the supporting position for providing a sufficient supporting force for the screw.

SUMMARY

However, when taking the aforementioned configurations, additional resilient mechanisms are configured at the supporting holders. Furthermore, when the supporting holder is at a position away from the screw, the portion of the screw corresponding to the supporting holder may sag due to its weight. As a result, when the open nut passes the portion of the screw having the supporting holder at the position away from the screw, the screw may encounter deflection, or the balls may not roll in the threaded groove properly due to the bending of the screw. Consequently, during the application of the ball guider device, the manufacturing precision becomes an issue and is to be considered.

In view of these, one embodiment of the instant disclosure provided a ball screw assembly. The ball screw assembly comprises a guider, an open nut, a plurality of open shields, a first circulator, a second circulator, and a plurality of ball circulating assemblies. The guider has a central axis and a plurality of spiral channels. The spiral channels are annularly disposed around an outer periphery of the guider. The open nut is slidably fitted over the guider. The open nut comprises an axial cylinder, and the axial cylinder has an axial opening. The axial cylinder has a first axial wall and a second axial wall respectively located at two opposite sides of the axial opening. The axial cylinder comprises an inner annular wall and an outer annular wall. The inner annular wall has a plurality of inner spiral channels. The inner spiral channels correspond to the spiral channels of the guider. The inner spiral channels and the spiral channels form a plurality of inner ball races.

Moreover, the open shields are coaxially fitted over an outer periphery of the axial cylinder. Each of the open shields has an inner peripheral wall. The inner peripheral wall corresponds to the outer annular wall of the axial cylinder. The inner peripheral wall and the outer annular wall form an outer ball race. In a virtual plane projection of the ball screw assembly from a radial direction, each of the outer ball races is perpendicular to the central axis.

The first circulator is disposed on the first axial wall. The first circulator comprises a plurality of first curves. Two ends of each of the first curves are respectively in communication with the corresponding inner ball race and the corresponding outer ball race. The second circulator is disposed on the second axial wall. The second circulator comprises a plurality of second curves. Two ends of each of the second curves are respectively in communication with the corresponding inner ball race and the corresponding outer ball race. Each of the ball circulating assemblies comprises a plurality of balls. One of the inner ball races, one of the first curves, one of the outer ball races, and one of the second curves form a first ball circulating race. Another one of the inner ball races, another one of the first curves, another one of the outer ball races, and another one of the second curves form a second ball circulating race. One of the first ball circulating assemblies rolls in the first ball circulating race, and another one of the ball circulating assemblies rolls in the second ball circulating race.

Another embodiment of the instant disclosure provided a ball screw assembly. The ball screw assembly comprises a guider, an open nut, a plurality of open shields, a first circulator, a second circulator, and a plurality of ball circulating assemblies. The guider has a central axis and a plurality of spiral channels. The spiral channels are annularly disposed around an outer periphery of the guider. The open nut is slidably fitted over the guider. The open nut comprises an axial cylinder, and the axial cylinder has an axial opening. The axial cylinder has a first axial wall and a second axial wall respectively located at two opposite sides of the axial opening. The axial cylinder comprises an inner annular wall and an outer annular wall. The inner annular wall has a plurality of inner spiral channels. The inner spiral channels correspond to the spiral channels of the guider. The inner spiral channels and the spiral channels form a plurality of inner ball races.

Moreover, the open shields are coaxially fitted over an outer periphery of the axial cylinder. Each of the open shields has an inner peripheral wall. The inner peripheral wall corresponds to the outer annular wall of the axial cylinder. The inner peripheral wall and the outer annular wall form an outer ball race. In a projection of a virtual plane of the open nut, each of the outer ball races is obliquely configured with respect to the central axis, the virtual plane is perpendicular to a symmetrical plane defined on the open shields upon the open shields are observed from one end of the central axis, and the virtual plane is parallel to the central axis.

The first circulator is disposed on the first axial wall. The first circulator comprises a plurality of first curves. Two ends of each of the first curves are respectively in communication with the corresponding inner ball race and the corresponding outer ball race. The second circulator is disposed on the second axial wall. The second circulator comprises a plurality of second curves. Two ends of each of the second curves are respectively in communication with the corresponding inner ball race and the corresponding outer ball race. Each of the ball circulating assemblies comprises a plurality of balls. One of the inner ball races, one of the first curves, one of the outer ball races, and one of the second curves form a first ball circulating race. Another one of the inner ball races, another one of the first curves, another one of the outer ball races, and another one of the second curves form a second ball circulating race. One of the first ball circulating assemblies rolls in the first ball circulating race, and another one of the ball circulating assemblies rolls in the second ball circulating race.

Accordingly, based on one or some embodiments of the instant disclosure, the axial cylinder of the open nut has the axial opening. Hence, when the open nut is disposed on the guider (e.g., a screw or a conversion rod) and moves along the guider, even if a supporting holder is configured below the guider, the open nut can pass the portion of the guider having the supporting holder through the axial opening, so that the open nut and the supporting holder do not interfere with each other. Therefore, the resilient mechanism on the supporting holder can be omitted. Moreover, when the open nut passes the portion of the guider having the supporting holder, the supporting holder is retained in a supporting state for the guider. Therefore, since the supporting holder does not detach from the guider, the guider does not sag or deform, and the manufacturing precision of the ball screw assembly during the application does not seriously affect the performance of the ball screw assembly. Furthermore, the open shield not only can form the outer ball race with the axial cylinder for the balls rolling in the outer channel, but also provides a dustproof function.

Furthermore, with the open shields, the first circulator, and the second circulator in a modular configuration, the open shields, the first circulators, and the second circulators in different numbers can be applied at certain portions of the open nut according to actual requirements. For example, one or two open shields, first circulators, and second circulators may be enough to provide a sufficient operation for a shorter or lighter carrier. Conversely, several open shields, first circulators, and second circulators may be used at proper positions for a longer or heavier carrier. The modular configuration allows the application of the ball screw assembly becoming flexible.

In one or some embodiments, a number of the first circulator is plural and a number of the second circulator is plural.

In one or some embodiments, the inner peripheral wall and the outer annular wall of one of the open shields further form a second outer ball race. The two ends of one of the first curves are respectively in communication with one of the inner ball races and the second outer ball race. The two ends of one of the second curves are respectively in communication with the one of the inner ball races and the second outer ball race. The one of the inner ball races, the one of the first curves, the second outer ball race, and the one of the second curves form a third ball circulating race. The one of the ball circulating assemblies rolls in the third ball circulating race.

In one or some embodiments, the first curves are obliquely configured with respect to a short side of the first circulator, and the second curves are obliquely configured with respect to a short side of the second circulator.

In one or some embodiments, the first curves and a short side of the first circulator are arranged parallel to each other, and the second curves and a short side of the second circulator are arranged parallel to each other.

In one or some embodiments, the ball screw assembly further comprises a ball retainer, and the balls are connected in series by the ball retainer.

In one or some embodiments, the outer annular wall of the axial cylinder has a plurality of outer channels, and the outer channels and the inner peripheral walls form the outer ball race. Moreover, in one or some embodiments, the inner peripheral wall of each of the open shields has an inner channel, the inner channels respectively correspond to the outer channels, and the outer channels and the inner channels form the outer ball races.

In one or some embodiments, the inner peripheral wall of each of the open shields has an inner channel, and the inner channels and the outer peripheral wall of the axial cylinder form the outer ball races.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
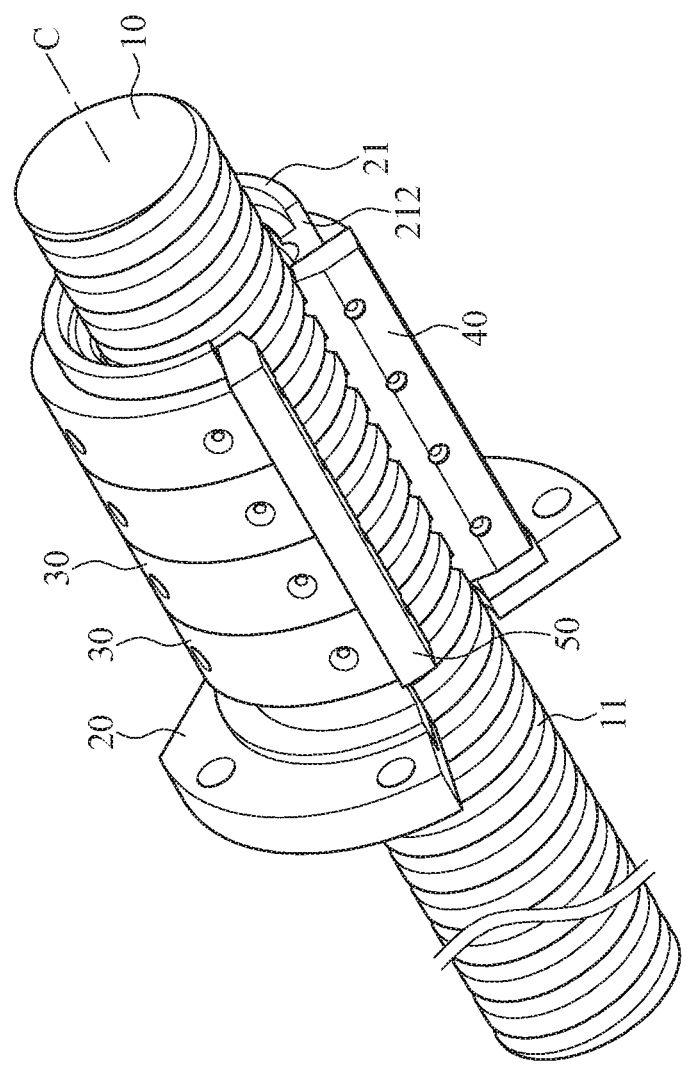
FIG. 1 illustrates a perspective view of a ball screw assembly according to a first embodiment of the instant disclosure.
Figure 2:
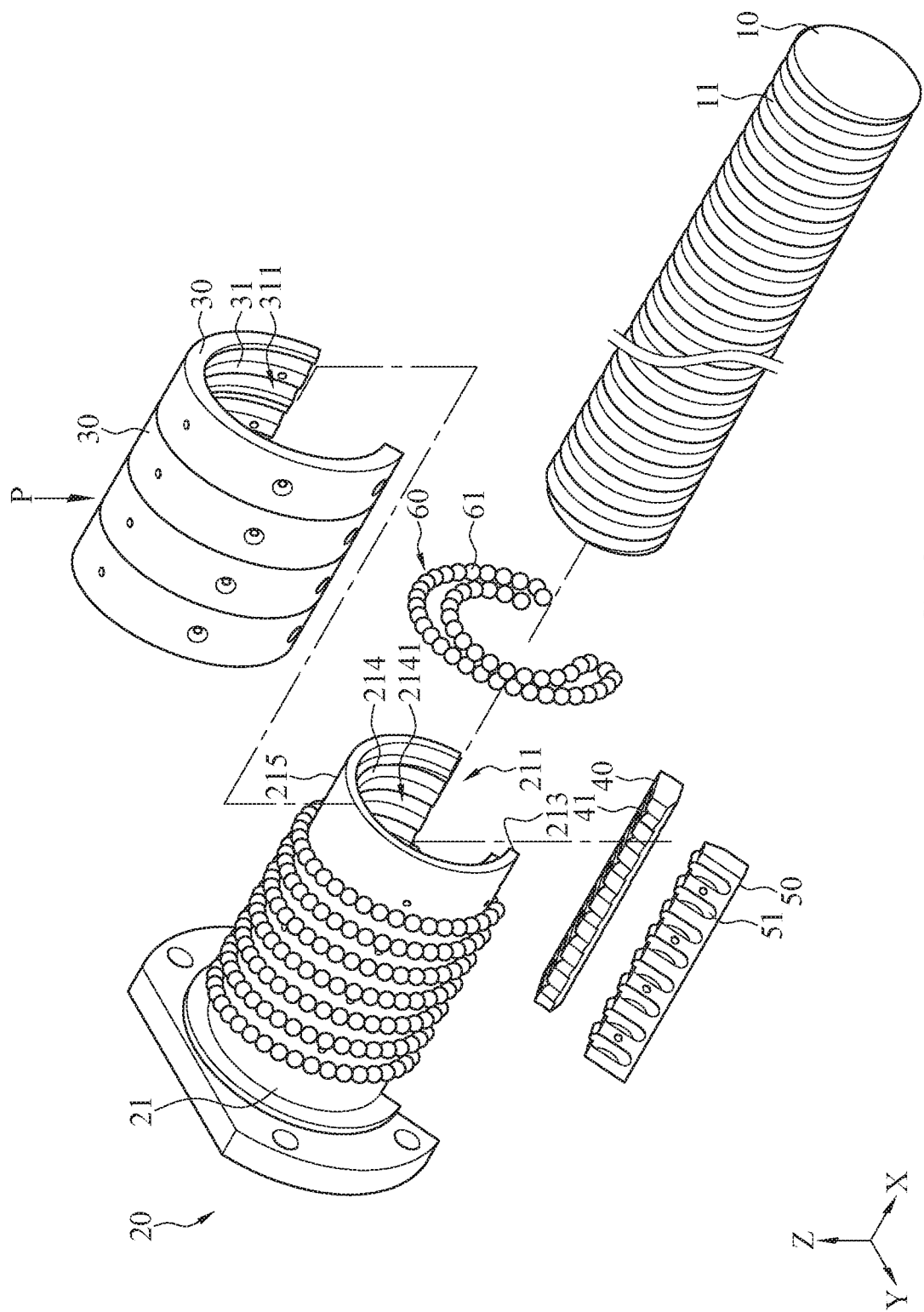
FIG. 2 illustrates an exploded view of the ball screw assembly of the first embodiment.
Figure 3:
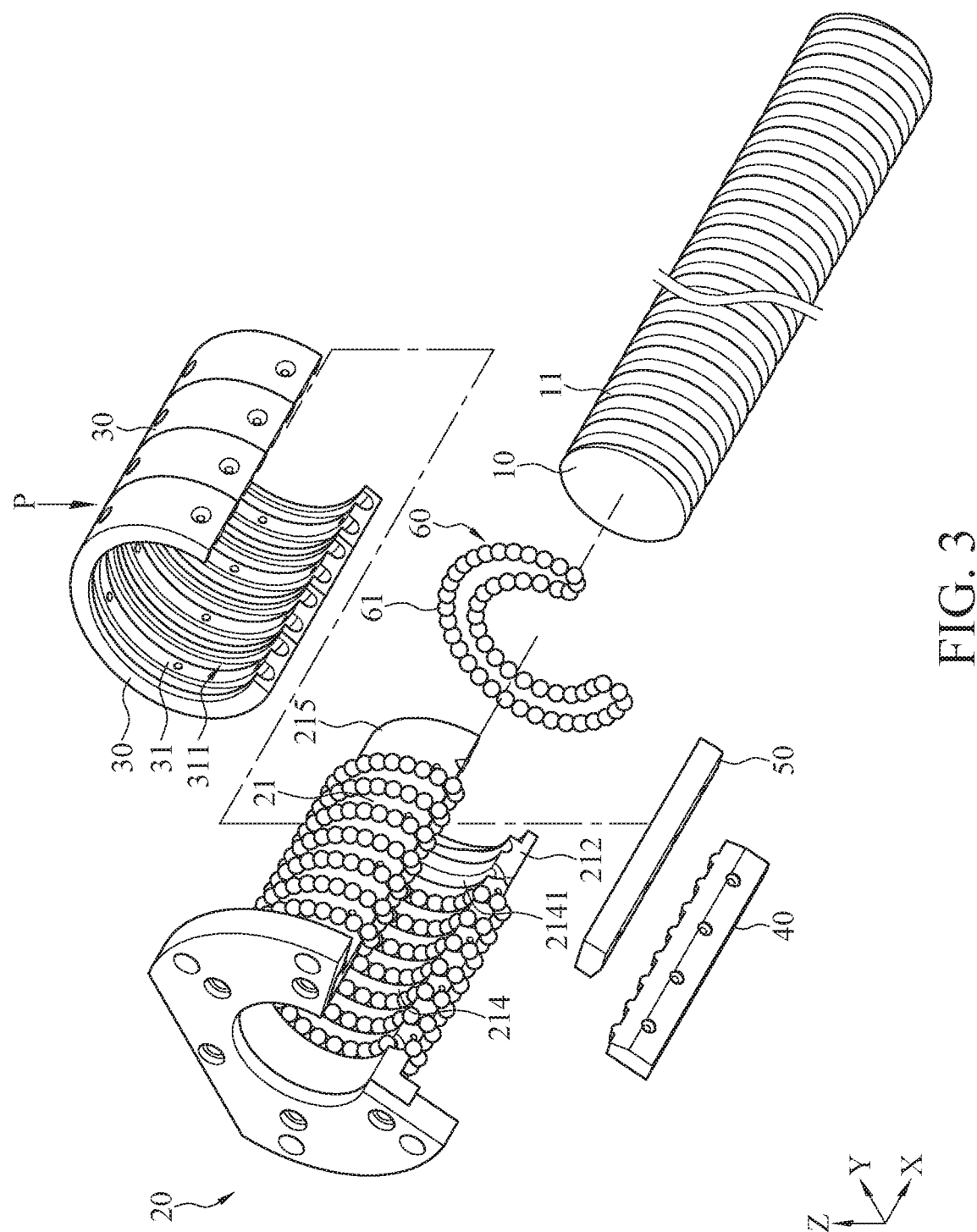
FIG. 3 illustrates an exploded view of the ball screw assembly of the first embodiment from another perspective.
Figure 4:
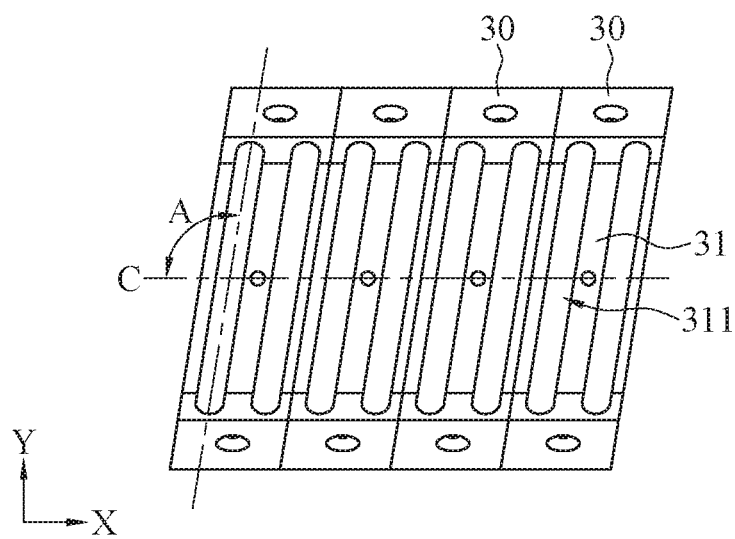
FIG. 4 illustrates a bottom view of open shields of the ball screw assembly of the first embodiment.
Figure 5:
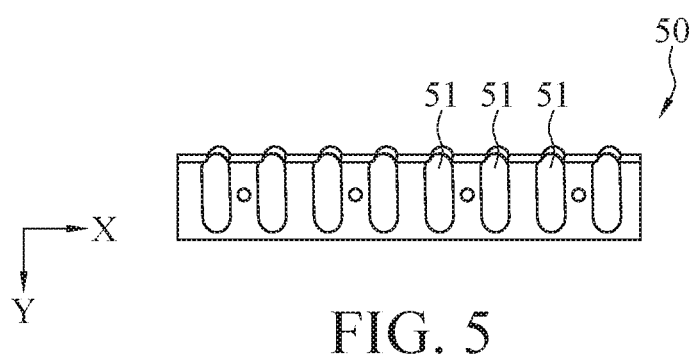
FIG. 5 illustrates a top view of a second circulator of the ball screw assembly of the first embodiment.

Please refer to FIGS. 1 to 5. FIG. 1 illustrates a perspective view of a ball screw assembly according to a first embodiment of the instant disclosure. FIG. 2 illustrates an exploded view of the ball screw assembly of the first embodiment. FIG. 3 illustrates an exploded view of the ball screw assembly of the first embodiment from another perspective. FIG. 4 illustrates a bottom view of open shields of the ball screw assembly of the first embodiment. FIG. 5 illustrates a top view of a second circulator of the ball screw assembly of the first embodiment.

As shown in FIGS. 1 and 2, in this embodiment, the ball screw assembly comprises a guider 10, an open nut 20, a plurality of open shields 30, a first circulator 40, a second circulator 50, and a plurality of ball circulating assemblies 60. The guider 10 may be, for example, a screw or a conversion rod. In this embodiment, the guider 10 is a screw for an illustrative example. As shown in FIG. 1, the guider 10 has a central axis C and spiral channels 11.

As shown in FIGS. 1 and 2, the open nut 20 comprises an axial cylinder 21, and the axial cylinder 21 has an axial opening 211. The axial cylinder 21 has a first axial wall 212 and a second axial wall 213 respectively located at two opposite sides of the axial opening 211. The axial cylinder 21 comprises an inner annular wall 214 and an outer annular wall 215. The inner annular wall 214 has inner spiral channels 2141. The inner spiral channels 2141 and the spiral channels 11 of the guider 10 correspond to each other and form inner ball races. Specifically, in this embodiment, the guider 10 has the spiral channels 11 annularly disposed around an outer periphery thereof. The spiral channels 11 are disposed around the outer periphery of the guider 10 to provide a spiral angle. The open nut 20 can be slidably fitted over the guider 10, so that the inner spiral channels 2141 and the spiral channels 11 of the guider 1 correspond to each other and form the inner ball races.

The open shield 30 is axially fitted over an outer periphery of the axial cylinder 21. Each of the open shields 30 has an inner peripheral wall 31. The inner peripheral walls 31 and the outer annular wall 215 of the axial cylinder 21 correspond to each other to form outer ball races. In this embodiment, to allow the ball circulating assemblies 60 to roll in the outer ball races in a circulating manner, the inner peripheral wall 31 of each of the open shields 30 has an inner channel 311, and the outer annular wall 215 of the axial cylinder 21 is a curved flat surface. Hence, the inner peripheral walls 31 can correspond to the outer annular wall 215 of the axial cylinder 21 to form the outer ball races.

In some embodiments, the outer annular wall 215 of the axial cylinder 21 forms an outer channel. Therefore, the outer channel and the inner peripheral wall 31 form the outer ball races. Alternatively, in some embodiments, the outer annular wall 215 of the axial cylinder 21 has the outer channel and the inner peripheral wall 31 of the each of the open shields 30 has the inner channel 311 corresponding to the outer channel. Hence, when the open shields 30 are assembled with the axial cylinder 21, the inner channels 311 of the inner peripheral walls 31 and the outer channel of the outer annular wall 215 form the outer ball races.

Furthermore, the open shields 30 not only can form the outer ball races with the axial cylinder 21 for the ball circulating assemblies 60 rolling in the outer ball races, but also provide a dustproof function.

In this embodiment, as shown in FIGS. 2 and 3, the number of the inner spiral channel 2141 is plural, but the embodiment is provided as an illustrative example, not a limitation to the instant disclosure. According to practical requirements, the ball screw assembly may include one inner spiral channel 2141; in some embodiments, the ball screw assembly may include two or more inner spiral channels 2141. For the sake of clarity, in FIGS. 2 and 3, one of the inner spiral channels 2141 is labelled.

Next, please refer to FIGS. 2 to 5. An XYZ triaxial coordinate where the axes are perpendicular to each other is illustrated in FIG. 2. In order to clearly present the structure of the ball screw assembly from different viewing angles, the figures are described based on the provided coordinate. As shown in FIGS. 2 and 4, the central axis C of the guider 10 extends in the X axis direction. For the sake of convenience, a symmetrical plane is defined and the symmetrical plane is a plane upon the open nut 20 or the open shields 30 are observed from one end of the central axis C (e.g., observed from one end of the X axis direction toward the direction of the X axis having positive values in the figures), and the open nut 20 or the open shields 30 are symmetrical by taking the plane as a linear symmetry reference; that is, in FIG. 2, the plane is a plane formed by the X axis and the Z axis. Moreover, a top viewing direction P is defined as a direction from the top of the figure to the bottom of the figure (viewing toward the direction of the Z axis having negative values). Furthermore, a plane perpendicular to the symmetrical plane and parallel to the central axis C is the plane formed by the X axis and the Y axis shown in FIG. 2, and is also the plane upon the open nut 20 or the open shield 30 is observed from the top viewing direction P.

The outer ball races are obliquely configured with respect to the central axis C. FIG. 4 presents an illustrative view showing that the open shields 30 are observed from a bottom view direction (i.e., observed from the direction of the Z axis having positive values). As shown in FIG. 4, in this embodiment, the inner channels 311 provided as the outer ball races are annularly disposed on the inner peripheral walls 31 along the radial direction. As indicated by the bottom viewing direction, the channel direction of each of the inner channels 311 is the oblique direction shown in the figure (in this embodiment, the oblique direction is from the upper right to the lower left, and the configuration of the inner channel 311 is called oblique groove). As shown in FIG. 4, when the inner channels 311 and the central axis C are projected along the bottom viewing direction, in the virtual plane projection of the open shields from the bottom viewing direction, the inner channels 311 are obliquely configured with respect to the central axis C; in other words, the angles A between the inner channels 311 and the central axis C are not right angles. Similarly, when the inner channels 311 and the central axis C are projected along the top viewing direction P on a projection plane (that is, the plane formed by the X axis and the Y axis), in the virtual plane projection along the top viewing direction P, the inner channels 311 are obliquely configured with respect to the central axis C; in other words, the angles between the inner channels 311 and the central axis C are not right angles.

Moreover, the inner spiral channels 2141 and the inner channels 311 are configured in a spiral manner. When the inner spiral channels 2141 and the inner channels 311 are spiral grooves with the same helical angle, that is, as indicated in this embodiment, when the inner spiral channels 2141 and the inner channels 311 are arranged parallel to each other, due to the inner spiral channels 2141 and the inner channels 311 have the same helical angle, when the ball circulating assembly 60 rolls in the ball circulating race, the ball circulating assembly 60 bears less loading and can roll in the ball circulating race continuously and smoothly, without excessive rolling angle change, thereby preventing from discontinuous rolling performance of the ball circulating assembly 60 in the ball circulating race.

Figure 6:
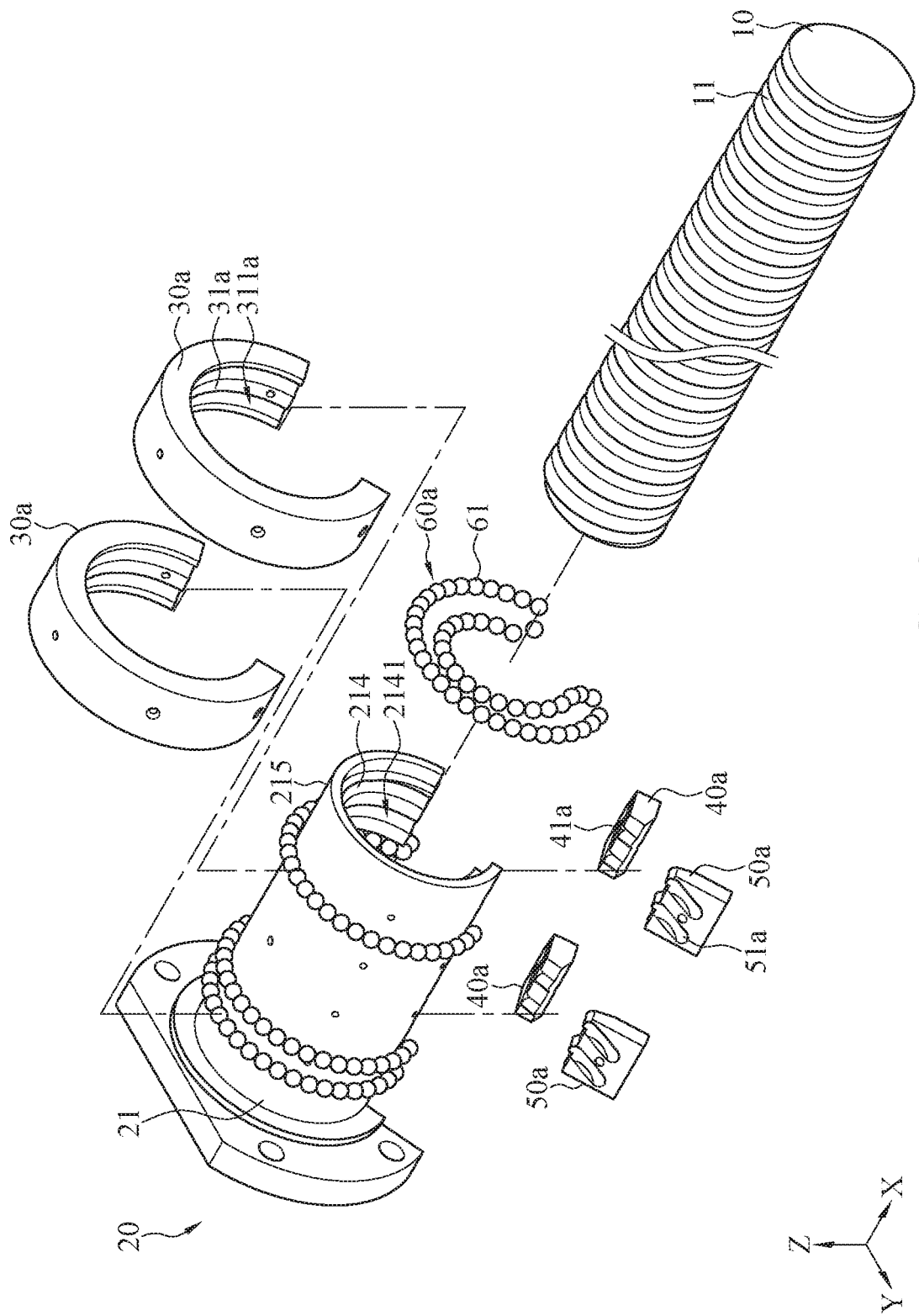
FIG. 6 illustrates an exploded view of a ball screw assembly according to a second embodiment of the instant disclosure.

Furthermore, as shown in FIGS. 1 to 3 as well as FIG. 6, the first circulator 40 is disposed on the first axial wall 212. The first circulator 40 comprises a plurality of first curves 41. Two ends of each of the first curves 41 are respectively in communication with the corresponding inner spiral channel 2141 (the inner ball race) and the corresponding inner channel 311 (the outer ball race). The second circulator 50 is disposed on the second axial wall 213. The second circulator 50 comprises a plurality of second curves 51. Two ends of each of the second curves 51 are respectively in communication with the corresponding inner spiral channel 2141 (the inner ball race) and the inner channel 311 (the outer ball race). In this embodiment, as shown in FIGS. 2 and 3, the number of the first curves and the number of the second curves are both plural. For the sake of clarity, in FIGS. 2 and 3, one of the first curves 41 and one of the second curves 51 are labelled.

The first circulator 40 and the second circulator 50 may be respectively disposed on the first axial wall 212 and the second axial wall 213 using threading, adhering, or engaging techniques. In the case that the threading technique is applied to disposed the circulators on the open nut 20, when the first circulator 40 and the second circulator 50 are worn due to long-term use, a user can simply replace the first circulator 40 and the second circulator 50 with new ones for continued use of the ball screw assembly, rather then replacing the entire ball screw assembly.

Furthermore, as shown in the embodiment, the first circulator 40 and the second circulator 50 may have the same structure. Hence, during the manufacturing process, one element is manufactured and served as both the first circulator 40 and the second circulator 50. It is understood that, according to practical requirements, the first circulator 40 and the second circulator 50 with different structures may be applied in the ball screw assembly. For instance, the first circulator 40 and the second circulator 50 with different numbers of curves may be applied, or the first circulator 40 and the second circulator 50 with different curve arrangement or different curve spacing may be applied.

Furthermore, as shown in FIG. 2, each of the ball circulating assemblies 60 comprises a plurality of balls 61. In detail, in this embodiment, the inner spiral channels 2141 (the inner ball races) aligned in order are taken as a first one channel, a second one channel, and so forth, from an end of the axial cylinder 21, the inner channels 311 (the outer ball races) aligned in order are taken as a first one channel, a second one channel, and so forth, from the end of the open shields 30, the first curves 41 are taken as a first one channel, a second one channel, and so forth, from the same end, and the second curves 51 are taken as a first one channel, a second one channel, and so forth, from the same end. As shown in FIG. 1, when the first circulator 40 and the second circulator 50 are assembled on the axial cylinder 21, the first one channel of the first curves 41 of the first circulator 40 on the first axial wall 212 of the axial cylinder 21 is in communication with the first one channel of the inner ball races and the first one channel of the outer ball races, and the first one channel of the second curves 51 of the second circulator 50 on the second axial wall 213 of the axial cylinder 21 is also in communication with the first one channel of the inner ball races and the first one channel of the outer ball races. Thus, the first one channel of the inner ball races, the first one channel of the first curves 41, the first one channel of the outer ball races, and the first one channel of the second curves 51 together form a first ball circulating race. Accordingly, all of the balls 61 of one of the ball circulating assemblies 60 can roll in the first ball circulating race in a circulating manner.

Conversely, the second one channel of the first curves is in communication with the second one channel of the inner ball races and the second one channel of the outer ball races, and the second one channel of the second curves is in communication with the second one channel of the inner ball races and the second one channel of the outer ball races. Thus, the second one channel of the inner ball races, the second one channel of the first curves 41, the second one channel of the outer ball races, and the second one channel of the second curves 51 together form a second ball circulating race. Accordingly, all of the balls 61 of another one of the ball circulating assemblies 60 can roll in the second ball circulating race in a circulating manner.

As above, the first circulator 40 and the second circulator 50 are disposed on the axial cylinder 21. Hence, the first circulator 40 is adapted to be in communication with the inner spiral channel 2141 on the inner annular wall 214 of the axial cylinder 21, and the second circulator 50 is adapted to be in communication with the inner channels 311 of the inner peripheral walls 31 of the open shields 30. Moreover, under this configuration, the ball circulating assembly 60 can roll from the inner spiral channel 2141 to the inner channel 311 in a smooth manner.

Moreover, as shown in FIGS. 2 and 3, though the ball screw assembly is provided with several ball circulating races in this embodiment, the number of the ball circulating assemblies 60 can be adjusted according to practical requirement, depending upon the loading requirements. For instance, the ball screw assembly may be provided with two ball circulating assemblies 60 disposed in two ball circulating races, or may be provided with much more ball circulating assemblies 60; alternatively, the ball circulating races may completely cover the entire open nut 20 and the entire open shield 30. Hence, the ball screw assembly can be applied for light and heavy loading requirements.

Further, as shown in FIGS. 2 and 3, in this embodiment, one ball circulating assembly 60 is disassembled and for illustrative purpose and also for showing the configuration of the balls 61 of the ball circulating assembly 60 in the ball circulating race. The ball circulating assembly 60 surrounds the inner ball race, the first curve 41, the outer ball race, and the second curve 51 to form a loop, and the ball circulating assembly 60 rolls in a circulating manner in an individual ball circulating race. In practice, as shown in FIGS. 2 and 3, the ball screw assembly may be provided with several ball circulating assemblies 60, and each of the ball circulating assemblies 60 individually rolls in the corresponding ball circulating race in a circulating manner.

Accordingly, based on one or some embodiments of the instant disclosure, the axial cylinder 21 of the open nut 20 has the axial opening 211. Hence, when the open nut 20 moves along the guider 10, even if a supporting holder (for example, a supporting base (not shown)) is configured below the guider 10, the open nut 20 can pass the portion of the guider 10 having the supporting holder through the axial opening 211, so that the open nut 20 and the supporting holder do not interfere with each other. Therefore, the resilient mechanism of the supporting molder for moving a guider to a position away from the ball screw can be omitted. Moreover, when the open nut 20 passes the portion of the guider 10 having the supporting holder, the supporting holder is retained in a supporting state for the guider 10. Therefore, since the supporting holder does not detach from the guider 10, the guider 10 does not sag or deform, and the manufacturing precision of the ball screw assembly during the application does not seriously affect the performance of the ball screw assembly.

As shown in FIGS. 2 and 3, in this embodiment, the ball screw assembly is provided with a plurality of ball circulating races and a plurality of ball circulating assemblies 60, respectively, and each of the ball circulating assemblies 60 individually rolls in the corresponding ball circulating race.

In some other embodiments, the two ends of the first curve 41 are respectively in communication with one first one inner ball race and a second one outer ball race, and the two ends of the second curve 51 are respectively in communication with the one inner ball race and the second one outer ball race. One of two ends of one of the first curve 41 is connected to the first one channel of the inner spiral channels 2141, and the other end of the first curve 41 is connected to the third one channel of the inner channels 311, rather being connected to the first one channel of the inner channels 311. Similarly, one of two ends of one of the second curves 51 is connected to the first one channel of the inner spiral channels 2141, and the other end of the second curve 51 is connected to the third one channel of the inner channels 311. It is understood that, such configuration may be accomplished by adjusting the inclination of the first curves 41 and the second curves 51.

For example, when the first curves 41 are configured obliquely with respect to the short side of the first circulator 40 and the second curves 51 are configured obliquely with respect to the short side of the second circulator 50, the inclinations of the first curves 41 and the second curves 51 can be adjusted to allow the communication between each of the inner spiral channels 2141 and the inner channel 2151 at a different line. Accordingly, the offset configurations for the inner ball race and the outer ball race can be implemented.

As above, the first one channel of the inner ball races, the first one channel of the first curves 41, the third one channel of the outer ball races, and the first one channel of the second curves 51 may together form one third ball circulating race. Accordingly, the ball circulating assembly 60 can roll in a circulating manner among the first one channel of the inner ball races, the first one channel of the first curves 41, the third one channel of the outer ball races, and the first one channel of the second curves 51. Hence, circulators with different configurations can be applied in the ball screw assembly, so that the inner ball race and the outer ball race at different lines can be mated with each other to form individual ball circulating races in different combinations. Therefore, according to different loading requirements, the inner ball race and the outer ball race at same lines or different lines can be mated with each other to form the ball circulating race.

In this embodiment, since the inner spiral channels 2141 and the inner channels 311 are spiral grooves with the same helical angle, the first curves 41 and the short side of the first circulator 40 are parallel to each other, and the second curves 51 and the short side of the second circulator 50 are parallel to each other. In this embodiment, because the first circulator 40 and the second circulator 50 have the same structure, only the second circulator 50 is illustrated in FIG. 5 for illustrative purposes. As shown from FIG. 5, the top view of the second circulator 50, when the number of the second curves 51 of the second circulator 50 is plural, the second curves 51 are aligned parallel to each other, and the second curves 51 are aligned straightly; that is, the second curves 51 are parallel to the short side of the second circulator 50. Similarly, the number of the first curves 41 of the first circulator 40 is plural, and the first curves 41 are aligned parallel to each other. Supposed that the first circulator 40 is arranged to an orientation the same as the second circulator 50 (i.e., the first circulator 40 and the second circulator 50 are viewed from the same viewing angle), the first curves 40 are also aligned straightly; that is, the first curves 41 are parallel to the short side of the first circulator 40. Accordingly, upon forming the first curves 41 on the first circulator 40 or forming the second curves 51 on the second circulator 50 in the manufacturing process, the configurations of the first curves 41 and the second curves 51 facilitate the determination of the milling direction for the circulators. Alternatively, upon forming the first circulator 40 or the second circulator 50 by injection molding, the configurations of the first curves 41 and the second curves 51 facilitate the mold manufacture and the demolding process.

Furthermore, in this embodiment, the balls 61 of the ball screw assembly does not need the ball retainer, and the balls 61 can be limited in the ball circulating race formed by the guider 10, the open nut 20, the open shields 30, the first circulator 40, and the second circulator 50 and can roll in the individual ball circulating race, without detaching off the ball circulating race. In other embodiments, the ball screw assembly further comprises a ball retainer, so that the balls 61 of the ball circulating assembly 60 are connected in series by the ball retainer.

Figure 7:
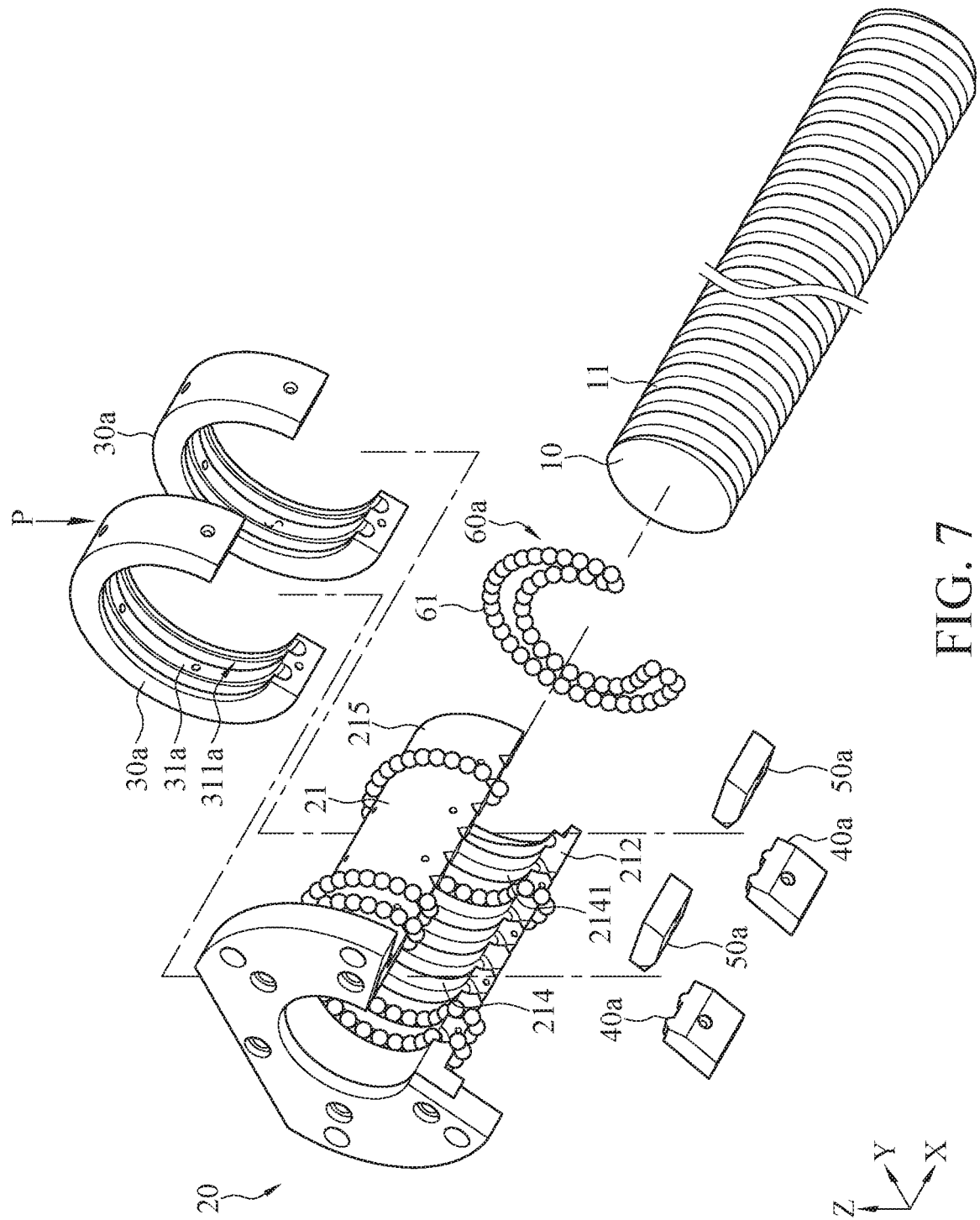
FIG. 7 illustrates an exploded view of the ball screw assembly of the second embodiment from another perspective.
Figure 8:
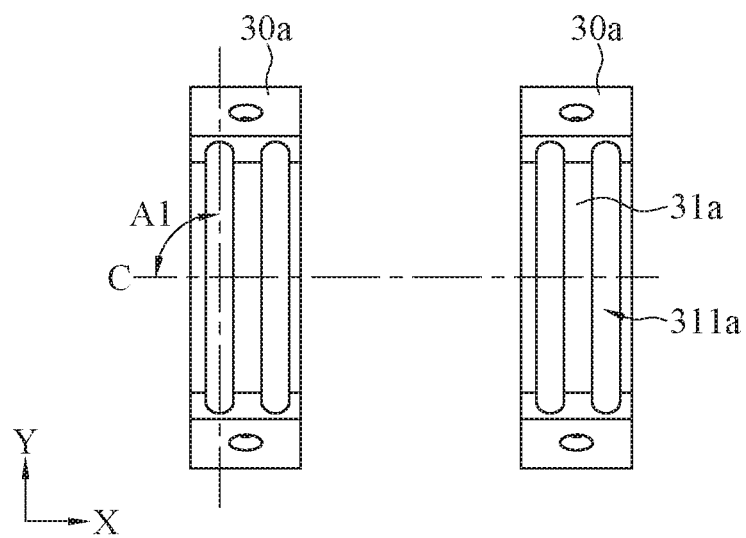
FIG. 8 illustrates a bottom view of open shields of the ball screw assembly of the second embodiment.
Figure 9:
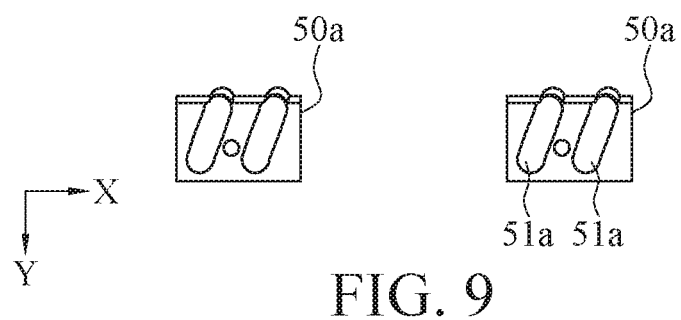
FIG. 9 illustrates a top view of a second circulator of the ball screw assembly of the second embodiment.

Next, please refer to FIGS. 6 to 9. FIG. 6 illustrates an exploded view of a ball screw assembly according to a second embodiment of the instant disclosure. FIG. 7 illustrates an exploded view of the ball screw assembly of the second embodiment from another perspective. FIG. 8 illustrates a bottom view of open shields of the ball screw assembly of the second embodiment. FIG. 9 illustrates a top view of a second circulator of the ball screw assembly of the second embodiment. The components which have same configurations in the first embodiment and the second embodiment are presented with the same reference numbers, and the detailed description thereof are omitted.

Firstly, one difference between the first embodiment and the second embodiment is that, in this embodiment, a plurality of open shields 30a (in FIG. 6, two open shields 30a) is spacedly disposed, and the ball circulating assemblies 60a are provided on portions of the axial cylinder 21 having the open shields 30a. Moreover, in this embodiment, the inner peripheral wall 31a of the open shield 30a forms an inner channel 311a, and the outer annular wall 215 of the axial cylinder 21 is a curved surface. Hence, the inner channel 311a and the outer peripheral wall 215 of the axial cylinder 21 together form an outer ball race.

However, the arrangement of the inner channel 311a in this embodiment is different from that in the first embodiment. Please refer to FIGS. 6 to 8, in this embodiment, the outer ball races are perpendicular to the central axis. As shown in FIG. 8, in this embodiment, the inner channels 311a provided as the outer ball races are annularly disposed on the inner peripheral walls 31a along the radial direction. As indicated by the bottom view, the channel direction of each of the inner channels 311a is the top to bottom direction shown in the figure (in this embodiment, the configuration of the inner channels 311a is called straight groove). When the inner channels 311a and the central axis C are projected along the bottom viewing direction, in the virtual plane projection of the open nut 21 from the bottom viewing direction, the inner channel 311a and the central axis C are perpendicular to each other; in other words, the angle A1 between the inner channels 311a and the central axis C are right angles. Similarly, when the inner channels 311a and the central axis C are projected along the top viewing direction P on a projection plane (that is, the plane formed by the X axis and the Y axis), in the virtual plane projection along the top viewing direction P, the inner channels 311a are perpendicular to the central axis C; in other words, the angles between the inner channels 311a and the central axis C are right angles.

Moreover, as shown in FIGS. 6 and 7, the number of the first circulator 40a is plural and the number of the second circulator 50a is plural. In this embodiment, to match with the number of the open shields 30a, two first circulators 40a and two second circulators 50a are shown in the figure. The two first circulators 40a are disposed on the first axial wall 212 and corresponding to the open shields 30a. Each of the first circulators 40a comprises a plurality of first curves 41a. Two ends of each of the first curves 41a are respectively in communication with the corresponding inner spiral channel 2141 (the inner ball race) and the inner channel 311a (the outer ball race). The two second circulators 50a are disposed on the second axial wall 213 and corresponding to the open shields 30a. Each of the second circulators 50a comprises a plurality of second curves 51a. Two ends of each of the second curves 51a are respectively in communication with the corresponding inner spiral channel 2141 (the inner ball race) and the inner channel 311a (the outer ball race). Therefore, as the first circulators 40a and the second circulators 50a can be correspondingly disposed on the open shields 30a, the open shields 30a, the first circulators 40a, and the second circulators 50a are in a modular configuration. The open shields 30a, the first circulators 40a, and the second circulators 50a in different numbers can be applied at certain portions of the open nut 20 according to actual requirements. Therefore, the overall loading can be reduced and the ball screw assembly can be applied in a flexible manner.

Furthermore, the size-reduced first circulators 40a and second circulators 50a have wider applications as compared with normal sized circulators. For example, the first circulators 40a and the second circulators 50a shown in this embodiment may be disposed on the long-type open shield 30 shown in the first embodiment. As long as several first circulators 40a and second circulators 50a are disposed on the long-type open shield 30, the ball screw assembly in such arrangement can provide a performance same as that provided by the ball screw assembly in the first embodiment.

Next, please refer to FIG. 9. Another difference between the first embodiment and the second embodiment is that, in this embodiment, the first curves 41a are configured obliquely with respect to the short side of the corresponding first circulator 40a, and the second curves 51a are configured obliquely with respect to the short side of the corresponding second circulator 50a. In this embodiment, because the first circulators 40a and the second circulators 50a have the same structure, only the second circulators 50a are illustrated in FIG. 9 for illustrative purposes. As shown from FIG. 9, the top view of the second circulators 50a, when the number of the second curves 51a of each of the second circulators 50a is plural, the second curves 51a are aligned parallel to each other, and the second curves 51a are aligned along a direction from upper right to lower left. Similarly, the number of the first curves 41a of each of the first circulators 40a is plural, and the first curves 41a are aligned parallel to each other. Supposed that one first circulator 40a is arranged to an orientation the same as one second circulator 50a (i.e., the first circulator 40a and the second circulator 50a are viewed from the same viewing angle), the first curves 40a are also aligned along a direction from upper right to lower left.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:
1. A ball screw assembly, comprising:
a guider having a central axis and a plurality of spiral channels, wherein the spiral channels are annularly disposed around an outer periphery of the guider;
an open nut slidably fitted over the guider, wherein the open nut comprises an axial cylinder, the axial cylinder has an axial opening, the axial opening runs through the axial cylinder from one end to another end to make the open nut in a C-shaped, the axial cylinder has a first axial wall and a second axial wall respectively located at two opposite sides of the axial opening; the axial cylinder comprises an inner annular wall and an outer annular wall, the inner annular wall has a plurality of inner spiral channels, the inner spiral channels correspond to the spiral channels of the guider, and the inner spiral channels and the spiral channels form a plurality of inner ball races;
a plurality of open shields each coaxially fitted over an outer periphery of the axial cylinder, wherein the plurality of open shields are arranged in sequence along the central axial, each of the open shields has an inner peripheral wall, the inner peripheral wall corresponds to the outer annular wall of the axial cylinder, and the inner peripheral wall and the outer annular wall form an outer ball race; wherein in a virtual plane projection of the open nut from a radial direction of the open nut, each of the outer ball races is perpendicular to the central axis;
a first circulator disposed on the first axial wall, wherein the first circulator comprises a plurality of first curves, and two ends of each of the first curves are respectively in communication with the corresponding inner ball race and the corresponding outer ball race;
a second circulator disposed on the second axial wall, wherein the second circulator comprises a plurality of second curves, and two ends of each of the second curves are respectively in communication with the corresponding inner ball race and the corresponding outer ball race; and
a plurality of ball circulating assemblies each comprises a plurality of balls, wherein one of the inner ball races, one of the first curves, one of the outer ball races, and one of the second curves form a first ball circulating race, another one of the inner ball races, another one of the first curves, another one of the outer ball races, and another one of the second curves form a second ball circulating race; one of the ball circulating assemblies rolls in the first ball circulating race, and another one of the ball circulating assemblies rolls in the second ball circulating race;
wherein the inner peripheral wall of each open shield has an inner channel, the outer annular wall of the axial cylinder is a curved flat surface, and the inner channels of the plurality of open shields and the outer annular wall of the axial cylinder form the outer spiral ball races.
2. A ball screw assembly, comprising:
a guider having a central axis and a plurality of spiral channels, wherein the spiral channels are annularly disposed around an outer periphery of the guider;
an open nut slidably fitted over the guider, wherein the open nut comprises an axial cylinder, the axial cylinder has an axial opening, the axial opening runs through the axial cylinder from one end to another end to make the open nut in a C-shaped, the axial cylinder has a first axial wall and a second axial wall respectively located at two opposite sides of the axial opening; the axial cylinder comprises an inner annular wall and an outer annular wall, the inner annular wall has a plurality of inner spiral channels, the inner spiral channels correspond to the spiral channels of the guider, and the inner spiral channels and the spiral channels form a plurality of inner ball races;

a plurality of open shields each coaxially fitted over an outer periphery of the axial cylinder, wherein the plurality of open shields are arranged in sequence along the central axial, each of the open shields has an inner peripheral wall, the inner peripheral wall corresponds to the outer annular wall of the axial cylinder, and the inner peripheral wall and the outer annular wall form an outer ball race; wherein in a projection of a virtual plane of the open nut, each of the outer ball races is obliquely configured with respect to the central axis, the virtual plane is perpendicular to a symmetrical plane defined on the open shields upon the open shields are observed from one end of the central axis, and the virtual plane is parallel to the central axis;

a first circulator disposed on the first axial wall, wherein the first circulator comprises a plurality of first curves, and two ends of each of the first curves are respectively in communication with the corresponding inner ball race and the corresponding outer ball race;

a second circulator disposed on the second axial wall, wherein the second circulator comprises a plurality of second curves, and two ends of each of the second curves are respectively in communication with the corresponding inner ball race and the corresponding outer ball race; and a plurality of ball circulating assemblies each comprises a plurality of balls, wherein one of the inner ball races, one of the first curves, one of the outer ball races, and one of the second curves form a first ball circulating race, another one of the inner ball races, another one of the first curves, another one of the outer ball races, and another one of the second curves form a second ball circulating race; one of the ball circulating assemblies rolls in the first ball circulating race, and another one of the ball circulating assemblies rolls in the second ball circulating race;

wherein the inner peripheral wall of each of the open shield has an inner channel, the outer annular wall of the axial cylinder is a curved flat surface, and the inner channels of the plurality of open shields and the outer annular wall of the axial cylinder form the outer spiral ball race.

3. The ball screw assembly according to claim 1, wherein a number of the first circulator is plural and a number of the second circulator is plural.

4. The ball screw assembly according to claim 2, wherein a number of the first circulator is plural and a number of the second circulator is plural.

5. The ball screw assembly according to claim 1, wherein the inner peripheral wall and the outer annular wall of one of the open shields further form a second outer ball race, the two ends of one of the first curves are respectively in communication with one of the inner ball races and the second outer ball race, the two ends of one of the second curves are respectively in communication with the one of the inner ball race and the second outer ball race; the one of the inner ball races, the one of the first curves, the second outer ball race, and the one of the second curves form a third ball circulating race, and the one of the ball circulating assemblies rolls in the third ball circulating race.

6. The ball screw assembly according to claim 2, wherein the inner peripheral wall and the outer annular wall of one of the open shields further form a second outer ball race, the two ends of one of the first curves are respectively in communication with one of the inner ball races and the second outer ball race, the two ends of one of the second curves are respectively in communication with the one of the inner ball race and the second outer ball race; the one of the inner ball races, the one of the first curves, the second outer ball race, and the one of the second curves form a third ball circulating race, and the one of the ball circulating assemblies rolls in the third ball circulating race.

7. The ball screw assembly according to claim 1, wherein the first curves are obliquely configured with respect to a short side of the first circulator, and the second curves are obliquely configured with respect to a short side of the second circulator.

8. The ball screw assembly according to claim 2, wherein the first curves are obliquely configured with respect to a short side of the first circulator, and the second curves are obliquely configured with respect to a short side of the second circulator.

9. The ball screw assembly according to claim 2, wherein the first curves and a short side of the first circulator are arranged parallel to each other; the second curves and a short side of the second circulator are arranged parallel to each other.

10. The ball screw assembly according to claim 1 wherein the first curves are arranged parallel to each other, and the second curves are arranged parallel to each other.

11. The ball screw assembly according to claim 2, wherein the first curves are arranged parallel to each other, and the second curves are arranged parallel to each other.

12. The ball screw assembly according to claim 1, further comprising a ball retainer, the balls are connected in series by the ball retainer.

13. The ball screw assembly according to claim 2, further comprising a ball retainer, the balls are connected in series by the ball retainer.

* * * * *